United States Patent [19]

Goossen et al.

[11] Patent Number: 4,904,859
[45] Date of Patent: Feb. 27, 1990

[54] SELF ELECTROOPTIC EFFECT DEVICE EMPLOYING ASYMMETRIC QUANTUM WELLS

[75] Inventors: Keith W. Goossen, Matawan; David A. B. Miller, Fair Haven, both of N.J.

[73] Assignees: American Telephone and Telegraph Company, New York, N.Y.; AT&T Bell Laboratories, Murray Hill, N.J.

[21] Appl. No.: 298,591

[22] Filed: Jan. 17, 1989

[51] Int. Cl.[4] .............................................. H01J 40/14
[52] U.S. Cl. ............................ 250/211 J; 250/213 A; 377/102
[58] Field of Search ....................... 250/211 J, 213 A; 377/102

[56] References Cited

U.S. PATENT DOCUMENTS

| Re. 32,893 | 3/1989 | Miller | 377/102 |
| 4,546,244 | 10/1985 | Miller | 250/211 J |
| 4,754,132 | 6/1988 | Hinton | 250/211 J |
| 4,800,262 | 1/1989 | Lentine | 250/211 J |

OTHER PUBLICATIONS

G. D. Sanders et al., J. Vac. Sci. Technol. B, vol. 5, No. 4, Jul./Aug. 1987, "Theory of Electroabsorption ...", pp. 1295–1299.
T. Hiroshima et al., J. Appl. Phys., vol. 62, No. 8, Oct. 1987, "Quantum-Confined Stark ...", pp. 3360–3365.
Y. J. Chen et al., Phys. Review B., vol. 36, No. 8, Sep. 15, 1987, "Effect of Electric Fields ...", pp. 4562–4565.
K. Nishi et al., Appl. Phys. Lett., vol. 51, No. 5, Aug. 3, 1987, "Enhancement of Quantum Confined ...", pp. 320–322.
M. N. Islam et al., Appl. Phys. Lett., vol. 50, No. 16, Apr. 20, 1987, "Electroabsorption in GaAs/AlGaAs ...", pp. 1098–1100.
H. Q. Le, et al., Appl. Phys. Lett., vol. 50, No. 21, May 25, 1987, "Stark Effect in $Al_xGa_{1-x}As/GaAs$ ...", pp. 1518–1520.
D. S. Chemla et al., Optical Engineering, vol. 24, No. 4, Jul./Aug. 1985, "Nonlinear Optical Properties ...", pp. 556–564.
D. A. B. Miller et al., Appl. Phys. Lett., vol. 45, No. 1, Jul. 1, 1984, "Noval Hybrid Optically Bistable ...", pp. 13–15.

Primary Examiner—David C. Nelms
Assistant Examiner—Sherrie Hsia
Attorney, Agent, or Firm—Gregory C. Ranieri

[57] ABSTRACT

Lower switching energies, enhanced electroabsorption and reduced tolerances on the operating wavelength of incident light are achieved while contrast between low and high absorption states is maintained in accordance with the principles of the invention by a self electrooptic device including an intrinsic quantum well region having an asymmetric electronic characteristic across a narrow bandgap subregion between the two wide bandgap layers defining the quantum well region. As a result, the quantum well region polarizes electrons and holes within the subregion in an opposite direction relative to a direction for an electric field applied to the device. The asymmetric electronic characteristic is realized as a compositionally graded, narrow bandgap layer or as a pair of coupled narrow bandgap layers of differing thicknesses separated by a thin wide bandgap layer.

8 Claims, 2 Drawing Sheets 4,904,859

SELF ELECTROOPTIC EFFECT DEVICE EMPLOYING ASYMMETRIC QUANTUM WELLS

TECHNICAL FIELD

This invention relates to the field of photonics devices and, more particularly, to devices known as self electrooptic effect devices.

BACKGROUND OF THE INVENTION

Optically bistable switching devices have been developed in a class known as self electrooptic effect devices (SEED). See U.S. Pat. No. 4,546,244. In SEED devices, optical bistability relies on incorporating semiconductor material whose absorption increases with increased excitation of the incorporated material.

An optically bistable SEED device generally comprises the interconnection of a p-i-n diode having an intrinsic quantum well region, an electrical or electronic load, and a bias voltage supply. The load and bias voltage supply are arranged in a feedback loop around the diode usually in a reverse bias configuration. When an electric field is applied perpendicular to the quantum well layers to permit electroabsorption by the quantum-confined Stark effect (QCSE), the absorption band edge including any sharp exciton resonance peaks is shifted to lower photon energies to achieve transmission changes of approximately 50%. Because the absorption edge is shifted toward lower photon energy under applied field conditions, the device is called a "red shift" device owing to the lower photon energy of red light in the visible light spectrum. Interband transitions give rise to a substantial amount of absorption for the biased SEED device. In general, the contrast between the low and high absorption states of the device is sufficient to permit realization of useful devices for modulation and the like.

With low optical power incident on the SEED device, nearly all the bias voltage is dropped across the diode because there is negligible, if any, photocurrent. The wavelength of light incident on the photodiode is carefully selected to be at or near the exciton resonance wavelength at zero applied field for peak or maximum absorption of the light. As incident light impinges on the reverse biased p-i-n diode, an increasing photocurrent is generated to, in turn, reduce the voltage across the diode by increasing the voltage drop across the load. The reduced voltage permits increased absorption to occur as the exciton resonance peak shifts back toward its zero applied field wavelength. Increased absorption provides a further increased photocurrent which, under proper regenerative feedback conditions, yields device switching.

Optically bistable SEED devices have been developed and reported in the prior art to operate in accordance with the principles set forth above. These devices have exhibited room temperature operation at high speed and low switching energy despite the lack of a resonant optical cavity which is commonly used to reduce switching energy. Moreover, such devices have been characterized by quantum well regions employing symmetric quantum wells. Symmetric quantum wells are known to produce the desired band edge absorption shift (a red shift) under applied field conditions so that increased absorption of incident light leads to switching necessary for bistable device operation.

SUMMARY OF THE INVENTION

Lower switching energies and reduced tolerances on the operating wavelength of incident light are achieved while contrast between low and high absorption states is maintained in accordance with the principles of the invention by a self electrooptic device including an intrinsic quantum well region having an asymmetric electronic characteristic across a narrow bandgap subregion between the two wide bandgap layers defining the quantum well region. As a result, the quantum well region polarizes electrons and holes within the subregion in an opposite direction relative to a direction for an electric field applied to the device. The asymmetric electronic characteristic is realized as a compositionally graded, narrow bandgap layer or as a pair of coupled narrow bandgap layers of differing thicknesses separated by a thin wide bandgap layer.

BRIEF DESCRIPTION OF THE DRAWING

A more complete understanding of the invention may be obtained by reading the following description of specific illustrative embodiments of the principles of this invention in conjunction with the appended drawing in which.

DETAILED DESCRIPTION

Figure 1:
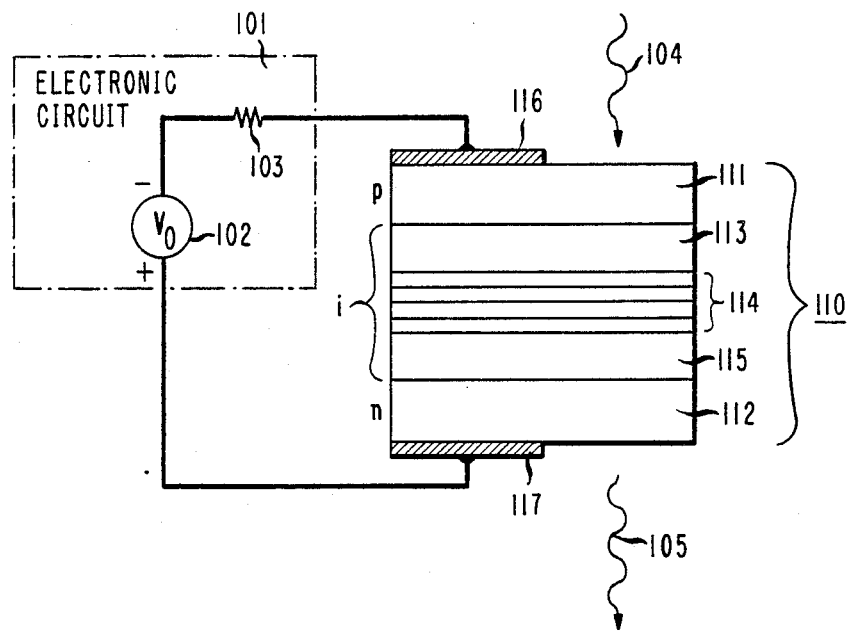
FIG. 1 is a schematic diagram of an embodiment of the self electrooptic device as employed by the invention.

FIG. 1 shows a schematic diagram of a basic self electrooptic effect device. This device is in accordance with the teachings of commonly assigned U.S. Pat. No. 4,546,244. Light beam 104 impinges on semiconductor device 110. A fraction of light beam 104 emerges from semiconductor device 110 as light beam 105. Semiconductor device 110 is biased by electronic circuit 101. For the example shown in FIG. 1, electronic circuit 101 includes reverse-bias voltage $V_o$ from bias voltage supply 102 connected in series with resistor 103 and semiconductor device 110.

Electronic circuit 101 may include a number of other components such as transistors, phototransistors and the like in series or parallel combination with a proper voltage or current supply. Realizations of electronic circuit 101 are shown throughout the '244 patent cited above. These realizations are incorporated herein expressly by reference.

The optical characteristics of semiconductor device 110 for the former self electrooptic device of the '244 patent are such that an increasing light intensity from input beam 104 leads to an increasing absorption coefficient by semiconductor device 1110. Interconnection with electronic circuit 101 provides a positive feedback mechanism to permit increasing optical absorption of light energy by semiconductor device 110 to lead to an increased optical absorption coefficient. It should be noted that when reference is made to the optical absorption coefficient it is also understood to encompass a reference in the alternative to the index of refraction because changes in the absorption spectrum also result in changes to the index of refraction as described in the Kramers-Kronig relationship.

For a semiconductor device 110 operating in accordance with the principles of the present invention, semiconductor device 110 operates by a different mechanism from the former device described immediately above. While the former semiconductor device included a symmetric quantum well region for its excitonic peaks as the mechanism for obtaining decreasing absorption with increasing field, the present semiconductor device 110 does not rely at all on excitonic peaks in the quantum well region to produce absorption changes with field variations. In the present semiconductor device 110, it is desirable only that the input light beam 104 at a wavelength near the bandgap energy of the quantum well region at zero applied field.

As shown in FIG. 1, semiconductor device 100 is contacted by electrical contact pads 116 and 117 in order to facilitate contact to electronic circuit 101. Generally, the electrical contact pads are standard ring contacts to permit a clear optical path for ingress and egress of light beams with respect to the semiconductor device and, more importantly, the quantum well region. Semiconductor device 110 includes a p-i-n structure wherein spacer regions 113 and 115 and quantum well region 114 are either intrinsic or nominally undoped, contact region 111 is p-type material and contact region 112 is n-type material. It is contemplated that quantum well region 114 include one or more quantum well layers of narrow bandgap material bounded on either side by a barrier layer of significantly wider bandgap material.

Quantum well region 114 is required to exhibit an asymmetry in a predetermined electronic characteristic such as bandgap or quantum well width for coupled quantum wells as the quantum well region is transversed from one buffer layer to the other, that is, from layer 113 to 115. The asymmetric characteristic is responsible for providing the "blue shift" in response to an increased applied field. It is preferred to incorporate the asymmetric characteristic in such a way that electrons and holes confined within each quantum well are polarized relative to each other in the quantum well region in an opposite direction to that which would be achieved by the electric field applied to the semiconductor device 110 on its own. Stated alternatively, it is preferred that the electron wave function be confined more toward the p-type side of the p-i-n diode than is the hole wave function, which spreads more toward the n-type side of the diode than does the electron wave function.

It is contemplated that the asymmetric electronic characteristic for the quantum well region may be realized by employing graded bandgap well layers wherein the grading is compositional from narrow bandgap material at one side to wider bandgap material near the other side. Grading techniques such as linear grading, parabolic grading, stepwide grading are among many well known grading techniques to be employed to achieve the desired asymmetry. Coupled quantum well techniques are also useful in realizing the desired asymmetric electronic characteristic for the quantum well region. Simple coupling techniques may be employed wherein narrow bandgap layers of unequal thickness are separated by a thin barrier layer of wider bandgap material. The bandgap of the barrier layer sandwiched by the coupled narrow bandgap well layers need not be equal to the bandgaps for the other barrier or buffer layers. Moreover, more than two quantum well layers may be coupled together to produce the desired asymmetry by employing barrier layers to appropriate thicknesses. In one example, monolayers of barrier material may be aperiodically deposited within the quantum well layer to provide the desired asymmetry via a coupled quantum well technique. Finally, combinations of compositional grading and coupled well techniques are also contemplated in the realization of the present invention.

Semiconductor device 110 may be fabricated by standard epitaxial processing techniques including molecular beam epitaxy and vapor phase epitaxy such as metal organic chemical vapor deposition.

Figure 2:
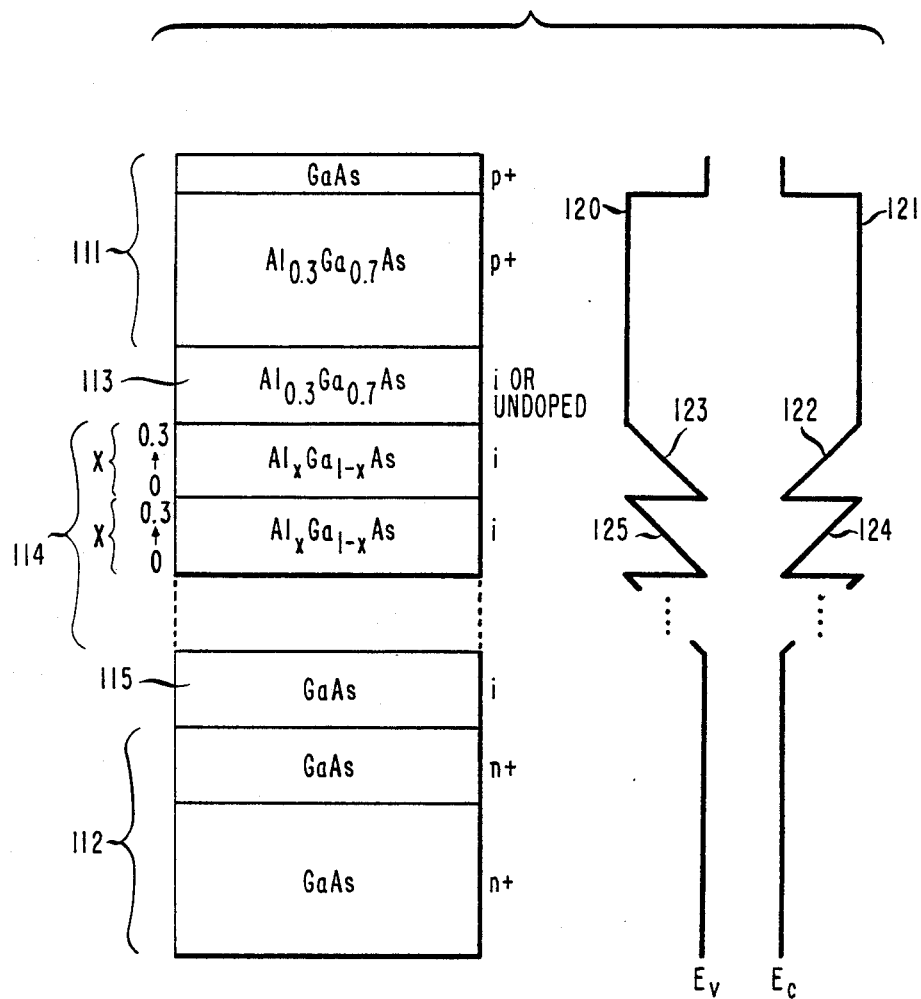
FIG. 2 is a cross-sectional view and conduction/valence band structure of an embodiment of the semiconductor device shown in FIG. 1.

For the device shown in FIG. 2, the growth process is started with in contact region 112 with GaAs substrate of greater than approximately 1000 Å thickness being doped with silicon to exhibit n+ conductivity with a concentration of $10^{18}$ atoms/cm$^3$. A buffer layer of GaAs doped similarly to the substrate with silicon to exhibit n+ conductivity with a concentration of $10^{18}$ atoms/cm$^3$ is grown on the substrate to a thickness of approximately 1000 Å. Epitaxially deposited on the buffer layer in contact region 112 is a GaAs spacer layer which is intrinsic or nominally undoped and which has a thickness of approximately 500 Å. Nominally undoped quantum well region 114 includes one or more Al$_x$Ga$_{1-x}$As layer having a thickness of approximately 500 Å and a mole fraction which decreases from 0.3 to 0.0 in a direction toward the contact region 112. The addition of more than one period of the asymmetric quantum well permits increased enhancement of the absorption coefficient. An undoped or intrinsic spacer layer of AlGaAs having an Al mole fraction of approximately 0.3 is grown on quantum well region 114 to a thickness of approximately 500 Å. Contact region 111 is grown on spacer region 113 to have a GaAs contact layer with thickness approximately 7000 Å doped with beryllium to exhibit p+ conductivity having a concentration of $10^{18}$ atoms/cm$^3$. A cap layer is grown on the contact layer. The cap layer is doped with beryllium to exhibit p+ conductivity with a concentration of $10^{18}$ atoms/cm$^3$ and is grown on the contact layer to a thickness of approximately 50 Å.

A profile of the conduction band 121 and valence band 121 is shown in FIG. 2 for zero applied electric field. The conduction and valence band energies are depicted as $E_c$ and $E_v$, respectively. In quantum well region 114, the asymmetric electronic characteristic is shown as a graded bandgap in which the conduction band energy decreases over conduction band segment 122 and the valence band energy increases over the corresponding valence band segment 123. The second period of the quantum well structure is shown with the conduction band energy for the second period decreasing over conduction band segment 124 and the valence band energy over the corresponding portion of the second period increasing over valence band segment 125.

For the semiconductor device 110 shown in FIG. 2 operating with no applied field from the electronic circuit, there is a displacement of the lowest energy level wave function toward a more highly confined state in the narrower bandgap portion of the compositionally graded band segment. Only the amount of shift differs for holes and electrons because heavy holes are more easily perturbed as a result of their large mass and small confinement energies thereby shifting more than electrons. As a consequence of this shift at zero applied field, there is a net average separation of holes and electrons or, alternatively, a net polarization of each electron-hole pair. This is analogous to a field effect caused by prebiasing a symmetric quantum well structure with a static electric field. If a field is applied from electronic circuit 101 via contact pads 116 and 117, the separation of electrons and holes is reduced so that the resulting quantum confined Stark effect begins as a "blue shift" (shift toward lower energy $\hbar\nu$) of the lowest electron-hole transition. This type of shift is completely opposite to the "red shift" exhibited by the prior art symmetric quantum well structures. Moreover, the "blue shift" device allows decreasing absorption coefficient with increasing field without regarding to excitonic peaks as required by symmetric quantum wells in the prior art. Operation of the device is expected to be preferred in the region near the bandgap energy for quantum well region 114 at zero applied electric field. In particular, it is preferred that input light beam 104 have a mean photon energy slightly below the band-edge absorption peak in its state of maximum "blue shift." Then semiconductor device 110 would be shifted between one state, where absorption is lowest (corresponding to maximum "blue shift" of the absorption band edge), using a high voltage to a second state, where absorption is high, using a low voltage.

Figure 3:
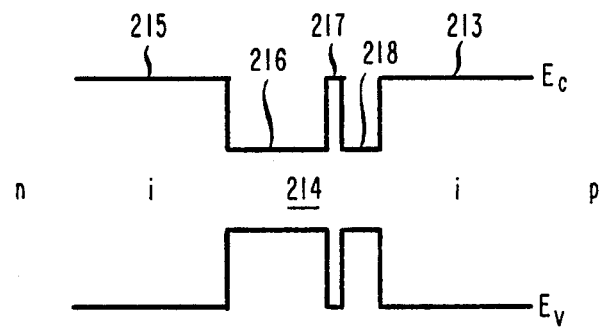
FIG. 3 shows the conduction and valence band diagrams for an alternative embodiment of an asymmetric quantum well region in accordance with the principles of the invention.

In FIG. 3, a conduction and valence band profile for an alternative embodiment of the quantum well region and adjacent spacer regions is shown. This embodiment could be substituted for the corresponding regions in the devices described above. The embodiment of FIG. 3 includes an asymmetric coupled quantum well structure wherein the thicker quantum well 216 is disposed toward the n-type side of the p-i-n diode and the thinner quantum well 218 is disposed toward the p-type side of the diode. This profile may be realized by a semiconductor structure including undoped AlGaAs spacer layers 213 and 215 on either side of quantum well region 214. Quantum well region 214 is undoped and, in one exemplary embodiment, includes 32 Angstrom GaAs quantum well 216 separated from 15 Angstrom GaAs quantum well 218 by 15 Angstrom AlGaAs barrier layer 217. It should be noted that, without an applied field, the lowest energy level wave function is displaced toward the thicker well layer, that is, quantum well 216.

While it has been stated that the precise parameters defining the excitonic peaks are less crucial for the present asymmetric quantum well device, it is important to consider suppression of exciton field ionization to avoid broadening the absorption band-edge with applied field. Such broadening would lead to degraded device performance.

The description given above is directed to a device in which the electric field is applied perpendicular to the quantum well layers and wherein the impinging light beams are also directed perpendicular to the quantum well layers. It is understood by those skilled in the art that the light may be directed parallel to the quantum well layers. Moreover, the electric field may be directed parallel to the layers.

Other configurations of the device 110 are contemplated within the spirit and scope of the present invention. For example, it is understood that the present invention is extensible to devices in which the resistor is integrated with the p-i-n diode. Also, a compound p-n-p-i-n structure is contemplated in which the p-n diode forms the photodiode and the p-i-n structure is the integrated modulator including the asymmetric quantum well region. It is further understood that the use of asymmetric quantum well regions is contemplated for all forms of self electrooptic effect devices such as the asymmetric SEED and the asymmetric SEED.

It is understood that, while the material system GaAs/AlGaAs is described above for fabricating the semiconductor device having the asymmetric quantum well region, other material combinations may be selected from other semiconductor Group III-V systems such as GaAs/AlAs, InGaAs/InAlAs, InGaAs/InGaAlAs, GaAsSb/GaAlAsSb and InGaAsP/InP. In these semiconductor systems, the layers may be lattice matched to suitable GaAs or InP substrates. Lattice mismatching is also contemplated wherein strained layers are grown over the substrate material. Finally, extension of the device structures is also contemplated to semiconductor compounds in Group II-VI and Group IV.

We claim:

1. An optical device comprising
means responsive to light for generating a photocurrent,
a structure having a semiconductor quantum well region, and
means responsive to said photocurrent for electrically controlling a coefficient of absorption of said semiconductor quantum well region in order to cause said coefficient of absorption to vary in response to variations of said photocurrent, said optical device CHARACTERIZED IN THAT,
said semiconductor quantum well region includes first and second layers and a subregion between and in contact with said first and second layers, said first and second layers comprising wide bandgap semiconductor material, said subregion comprising at least one layer of substantially narrow bandgap semiconductor material, said subregion having a substantially asymmetric electronic characteristic along a width of said subregion region from said first layer to said second layer for polarizing electrons and holes within said quantum well region in an opposite direction relative to a direction of an electric field applied to said structure.

2. The optical device as defined in claim 1 further characterized in that,
said subregion includes a third layer comprising substantially narrow bandgap semiconductor material wherein the bandgap for said third layer increases linearly across said third layer.

3. The optical device as defined in claim 1 further characterized in that,
said subregion includes a third layer comprising substantially narrow bandgap semiconductor material wherein the bandgap for said third layer increases in a stepwise manner across said third layer.

4. The optical device as defined in claim 1 further characterized in that,
said subregion includes a third layer comprising substantially narrow bandgap semiconductor material wherein the bandgap for said third layer increases parabolically across said third layer.

5. The optical device as defined in claim 1 further characterized in that,
said subregion includes a third layer adjacent to said first layer comprising substantially narrow bandgap semiconductor material, a fourth layer adjacent to said third layer comprising semiconductor material having a bandgap wider than said third layer, a fifth layer adjacent to said fourth layer comprising substantially narrow bandgap semiconductor material wherein said third layer has a thickness greater than a thickness of said fifth layer.

6. The optical device as defined in claim 5 further characterized in that,
   said fourth layer has a thickness of substantially single atomic layer.

7. The optical device as defined in claim 1 further characterized in that,
   said subregion includes a third layer adjacent to said first layer comprising substantially narrow bandgap semiconductor material, said third layer further including at least fourth and fifth layers comprising semiconductor material having a bandgap wider than said third layer, wherein said at least fourth and fifth layers are aperiodically spaced within said third layer.

8. The optical device as defined in claim 7 further characterized in that,
   said at least fourth and fifth layers have individual thicknesses of substantially a single atomic layer.

* * * * *